Figure 1:
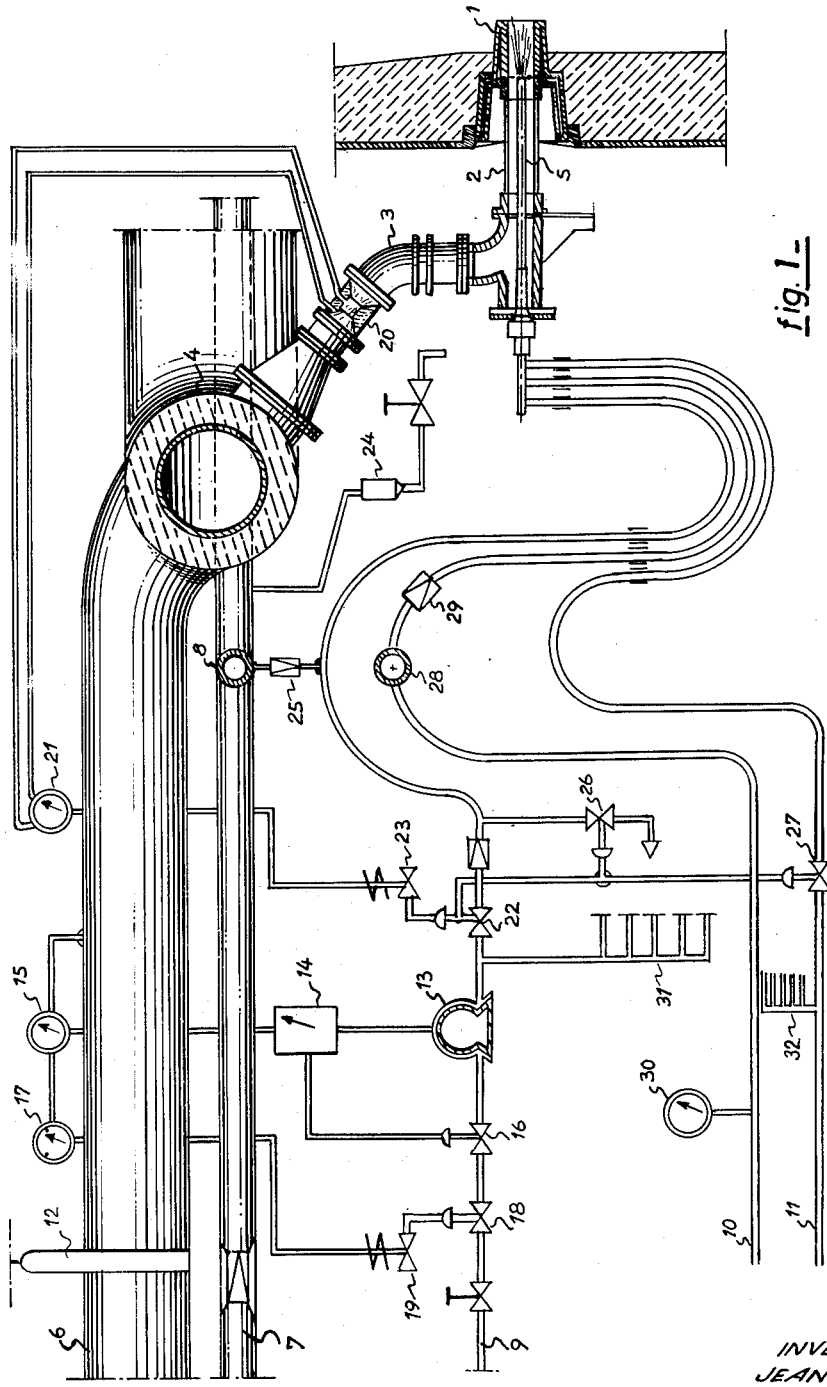

United States Patent Office 3,212,879
Patented Oct. 19, 1965

3,212,879
PROCESS AND APPARATUS FOR CONTROLLING SHAFT FURNACES
Jean Cordier, Saint Germain-en-Laye, France, assignor to Institut de Recherches de la Siderurgie Francaise, Saint Germain-en-Laye, France, a professional institution of France
Filed Oct. 15, 1962, Ser. No. 230,572
Claims priority, application France, Oct. 13, 1961, 875,869, Patent 1,310,593
2 Claims. (Cl. 75—41)

The present invention relates to shaft furnaces.

In particular, the present invention relates to controls for a shaft furnace such as a blast furnace, especially of the type where there is introduced into the furnace through the tuyeres thereof not only the blast but also a fuel which will replace an equivalent amount of coke which would otherwise be required.

It has been found in practice that where the shaft furnace is operated with the introduction of fuel through the tuyeres, there is not only a saving in coke and an increase in the output of the furnace, but also there is a certain flexibility in the manner in which the furnace can be operated, as a result of the rapidity with which a change in the flow of the fuel acts on the charge at the level of the tuyeres.

It is a primary object of the present invention to greatly improve the efficiency of the operation of furnaces of this type, particularly by way of controlling the manner in which the fuel is injected through the tuyeres into the furnace.

Another object of the present invention is to provide a process and apparatus capable of controlling the rate of fuel flow in relation to the rate of supply of the blast in such a way that any tendency of the flow of the blast to slow down will be opposed and optimum operating conditions will become automatically re-established.

A further object of the present invention is to provide a structure which will automatically take care of the situation where the flow of the blast through any one tuyere is obstructed.

It is furthermore an object of the present invention to provide a process and apparatus which will maintain the fuel conduits cool even when the flow of fuel therethrough is interrupted and which will also prevent the conduits from becoming clogged.

It is furthermore an object of the present invention to provide a process and apparatus which will render the operation of a shaft furnace extremely safe in that there will be automatic termination of the flow of fuel in the event that the operating conditions reach certain dangerous levels.

Still another object of the present invention is to provide a process and apparatus which enable a given amount of fuel to replace a relatively large amount of coke, so that the operation of a furnace with the process and apparatus of the invention is extremely economical.

With these objects in view, the invention includes, in a process for operating a shaft furnace, the step of regulating the flow of fuel through an injector of a tuyere in such a way that this flow of fuel is in direct proportion to the pressure of the blast which is introduced through the tuyere, and in accordance with the process of the invention the flow of fuel is terminated if the pressure of the blast reaches a given upper or a given lower limit.

The apparatus of the invention includes a tuyere means and a blast conduit means as well as a fuel conduit means for respectively supplying a blast and fuel through the tuyere means to be supplied to the interior of the furnace. A regulating valve means is operatively connected with the fuel conduit means to regulate the flow of fuel therethrough and a means communicates with the blast conduit means and with the regulating valve means to actuate the latter to provide in the fuel conduit means a flow of fuel which is in direct proportion to the pressure of the blast in the blast conduit means.

Figure 2:
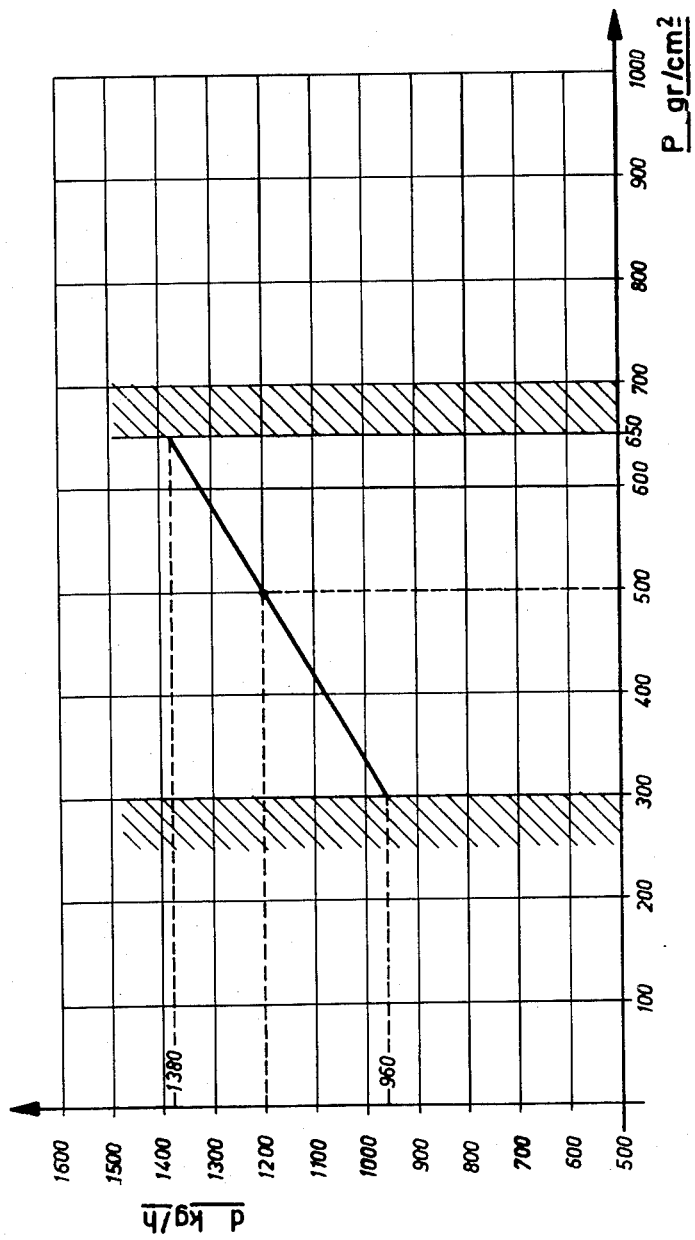

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of a structure according to the present invention; and FIG. 2 is a graphical representation of the controls provided in accordance with the present invention.

As has been pointed out above, there are certain advantages to be derived from operating a furnace with the introduction of fuel through injectors which extend through the several tuyeres, respectively, because in this way less coke is required. However, there is the problem of how to regulate the flow of the fuel in such a furnace. It has been found that it is not suitable to provide a flow of fuel which is proportional to the flow of the blast.

In normal conditions, the supply of the blast is maintained at a maximum and constant rate. If said rate of flows down, it is caused only by a hanging or scaffold, and in that case it is advisable to increase the ratio of the fuel to the blast in order to decrease the temperature of the charge. That is obtained automatically in a certain degree, and generally insufficiently, when the rate of flow of the fuel is constant. According to these facts it is easier to understand that a more perfect method of adjustment would consist in regulating the rate of flow of fuel by the pressure of the blast, and the present invention is a consequence thereof. As soon as the blast furnace is very permeable the pressure of the blast slows down and the injection of fuel is reduced. On the contrary, as soon as a hanging occurs the pressure of the blast increases and the rate of flow of fuel is increased automatically, which causes the hanging to be reabsorbed rapidly. Thus, the rate of fuel flow increases and decreases as the blast pressure increases and decreases, respectively. Practical experience has shown that a blast furnace operated according to the above method is running much more evenly and without hanging.

In accordance with the present invention, it has been found that the best possible operating conditions will be provided where the rate of flow of the fuel is made directly proportional to the pressure of the hot blast. With such an arrangement and process, where the temperature of the charge is too low it will be possible for the gas to flow easily through the charge with the result that the pressure of the blast drops, and under these conditions there will be, in accordance with the present invention a reduction in the rate of supply of the fuel. On the other hand, when the rate of flow of the hot blast diminishes, as would be the case when the temperature of the charge is too high, then the pressure of the hot blast necessarily increases and in accordance with the present invention there is a corresponding automatic increase in the rate of supply of the fuel, with the result that the hanging is rapidly reabsorbed in the furnace and normal operating conditions are quickly re-established. Experience has proved that where a blast furnace is operated with the process and apparatus of the present invention the operations are maintained at normal levels with far greater regularity and there is a great reduction in the risks of hanging.

It has also been found that where the fuel supply is controlled in accordance with the invention it is possible to reduce the amount of fuel required for the best possible operation of the furnace and the amount of coke which is replaced by the fuel is increased. However, the great flexibility in the controls which can be provided with the invention leads to operation of the furnace in the most economical manner near the limit at which hanging may occur. However, there is a considerable risk in such operation because the operators of the furnaces would be greatly tempted to "push" the injection of the fuel so as to attempt to avoid any hanging and in order to avoid the dangers inherent in such operations the structure of the invention is capable of operating automatically in such a way as to provide maximum output at minimum risk of any serious accidents. The terms "set minimum pressure" and "set maximum pressure" define those pressures which limit the pressure range within which operation of the furnace is safe.

Thus, the structure of the invention provides automatic interruption in the flow of fuel when the pressure reaches a given maximum limit or a given minimum limit. In accordance with the invention the supply of fuel will be cut off when the pressure of the hot blast falls as a result of any stoppage or troubles which might occur in the supply of the hot blast to the furnace. It is of course important to interrupt the flow of fuel when the pressure of the hot blast exceeds a certain limit since it is desirable under these conditions to remove from the furnace all hydrogen where there has been a serious hanging in the shaft and a threat of a sudden fall of the charge.

Furthermore, it is possible in accordance with the process and apparatus of the invention to automatically control each individual tuyere so that if, for example, the flow of the hot blast through a given tuyere is obstructed the flow of fuel will also be automatically terminated through the particular tuyere. It can happen that a solid particle of the charge, which has not yet become molten, becomes located in front of the discharge end of a tuyere and reduces the rate of flow of the hot blast therethrough to a substantial degree, and in such a case with the invention the rate of flow of the fuel will be reduced and will even be terminated if the rate of flow of the hot blast drops off by a sufficient amount. It is known that when a hydrocarbon fuel is injected through a tuyere into the furnace, the heat which is absorbed by the fuel itself during the heating thereof and even the cracking thereof results in a lowering of the temperature of combustion in the zone of the tuyeres, the effect being the same as if the temperature of the hot blast were reduced. This effect of the lowering of the temperature is cut down if the fuel supply is diminished or cut off. Thus, by cutting off the supply of fuel under these conditions the relatively colder particle of the charge will melt more rapidly in front of the tuyere and the return to normal operating conditions with automatic resumption of the supply of fuel is more rapid. In other words, the lower temperature which would result if the supply of fuel were continued with a drop in the rate of supply of the hot blast where the tuyere is obstructed is eliminated so that whatever hot blast arrives at the tuyere does not have its temperature diminished since the flow of fuel has been interrupted, and thus a relatively hotter gas is applied to the particle which happens to be obstructing the tuyere with the result that it melts more rapidly and permits normal operations to be resumed more quickly.

In the example described below the fuel specifically referred to is mazout, which is a thick, viscous residue left in the still after normal distillation of volatile fractions of crude petroleum. The operations described below were carried out with the injection of mazout in the tuyeres of a blast furnace having a hearth diameter of 4.5 m.

Referring to FIG. 1, it will be seen that the tuyere 1 of the blast furnace is provided with a nozzle 2 which communicates with a blast pipe 3 forming part of a blast conduit means which includes a circular blast conduit 4 from which the hot blast is delivered to the several blast pipes 3 which are distributed about the furnace and which respectively communicate with the several nozzles 2 of the several tuyeres 1, only one tuyere and the structure associated therewith being shown in the drawing for the sake of clarity. The mazout is injected into the tuyere by means of a suitable injector 5. As is shown schematically in the drawing, the blast conduit means also includes a supply conduit 6 for the hot blast, this conduit 6 communicating with the circular header 4 with which the several blast pipes 3 communicate. A steam supply conduit 7 is also provided, this conduit 7 communicating with a circular conduit 8. The mazout under pressure of approximately 7 kg./cm.$^2$ flows through a fuel supply conduit means 9, and compressed air for atomizing the fuel at a pressure of 5 kg./cm.$^2$ is delivered to the injector 5 through the conduit 10, these conduits 9 and 10 communicating with the injector 5 in the manner illustrated in FIG. 1. Also, a conduit 11 supplies compressed air at a moderate pressure for the purpose of cooling the injector, as described below.

The steam which is supplied to the conduit 7 and the compressed air supplied to the conduit 11 are used only where the supply of fuel is interrupted, the steam and compressed air being used to clean and cool the injector 5.

The total flow of the hot blast to all of the tuyeres is controlled by a main hot blast valve 12 operatively connected with the supply pipe 6 upstream of the header 4. The total flow of mazout is measured by a suitable flow meter or other equivalent device 13 which is capable of pneumatically transmitting the rate of fuel flow to a pneumatic regulator 14 of known construction which also receives indications from the pressure gauge 15 which communicates with the interior of the blast conduit means 6 and which pneumatically transmits the pressure indications to the regulator 14. The regulator 14 cooperates pneumatically with an automatic regulating valve cooperates pneumatically with an automatic regulating valve 16 operatively connected to the fuel conduit means 9, and in a manner well known in the art the regulator 14 is capable of automatically actuating the valve 16 to regulate the flow of fuel in such a way that a predetermined relationship is maintained between the pressure of the hot blast, as detected by the gauge 15, and the rate of fuel flow, as detected by the meter 13. The pneumatic regulator 14 controls the valve 16 in accordance with the present invention so as to maintain a rate of fuel supply which is directly proportional to the pressure of the hot blast in the conduit 6, as will also be described with greater particularity below.

A second pressure gauge 17 communicates also with the interior of the conduit 6, and this gauge 17 is provided in a known way with switches which become automatically closed either in the case where the pressure reaches a given upper limit or in the case where the pressure reaches a given lower limit, so that whenever the pressure goes above or below a given range of pressures one of the switches of the gauge 17 will be automatically closed. The gauge 17 is connected electrically with the electrical structure 19 which may be, for example, a solenoid operatively connected with the valve 18 so as to close the valve 18 when the solenoid is energized. The valve 18 forms a shut-off valve means operatively connected to the fuel supply conduit means 9 upstream of the regulating valve means 16, and whenever one of the switches of the gauge 17 is closed the valve 18 will be closed so that in this way the supply of fuel is automatically terminated to all of the injectors of all of the tuyeres in the case where the pressure of the hot blast either rises above or falls below a given range of pressures. Thus, where there is any serious drop in the flow of the hot blast either because of something which happened upstream of the valve 12 or because of something which occurs in the furnace downstream of the valve 12, the resulting pressure change will be detected and the flow of fuel will be automatically interrupted.

The above controls are provided for all of the tuyeres and all of the injectors. However, as has been pointed out above, it is also of advantage to be able to control each tuyere individually to take care of the situation where a lump of ore of the charge happens to become located at the discharge end of the tuyere to block temporarily the flow of the hot blast therethrough. For this purpose each blast pipe 3 is provided with a Venturi 20 made of a refractory concrete, and a manometer means 21 is operatively connected with Venturi 20 in a manner shown diagrammatically in FIG. 1, so that by measuring the pressure differential of the flow of the hot blast through the Venturi it is possible to detect any undesirable changes in the characterictics of the flow of the hot blast. Thus, under normal conditions there will be a given pressure differential detected by the manometer 21, while if the flow of the hot blast through the tuyere is obstructed the pressure differential will of course diminish at the Venturi 20 so that the manometer will detect the fact that the flow of the hot blast is obstructed. The manometer 21 is constructed in a known way to close a switch when the pressure differential at the Venturi 20 reaches a given minimum, and the closing of the switch will energize an electrical device such as a solenoid 23 which will automatically close the valve 22 also operatively connected to the fuel supply conduit means 9. It will be noted that the valve 22 is located in the fuel conduit means 9 downstream of the branches 31 which deliver the fuel from the conduit 9 to the other injectors of the other tuyeres, so that the closing of the valve 22 as a result of detection by the manometer 21 of reduction in the rate of flow of the hot blast through the blast pipe 3 does not in any way interfere with the continuation of the supply of fuel through the several conduits 31 to the other tuyeres.

As is apparent from the above description, there will be during the continued operation of a blast furnace or other shaft furnace capable of using the structure and process of the invention an interruption in the flow of fuel from time to time. When the pressure of the hot blast becomes too great or too small the injection of fuel is terminated at all of the tuyeres at the same time by operation of the shut-off valve 18. When the flow of the hot blast through any one tuyere diminishes to a relatively large extent, the supply of fuel through this particular tuyere will be automatically terminated by closing of the valve 22. Whenever such interruptions in the supply of fuel occur, as is also the case when the operator manually terminates the supply of fuel, the conduits and the injectors which are out of service should be cleaned of the mazout which they contain so as to avoid cracking of the mazout and clogging of the conduits and injectors. Moreover, the flow of fuel through the injectors serves to maintain them at a relatively low temperature, and the cooling effect provided by the flow of fuel through the injectors is of course interrupted when the fuel flow is stopped. It is therefore necessary to provide cooling from some other source under these conditions.

For the purpose of cleaning and cooling the tuyeres when the flow of fuel is interrupted, the circular steam conduit 8 is maintained permanently under pressure. The condensate is evacuated from the conduit 8 by the discharge device 24. During injection of fuel the steam is maintained in the conduit 8 by the non-return valve 25 which is maintained closed as a result of the pressure in the fuel conduit. When, however, the supply of fuel is interrupted the pressure of the fuel drops and even disappears completely, so that the valve 25 opens admitting steam which will clean the fuel conduit and injector. This will happen not only in the case where the valve 18 closes, in which event the steam will flow through the several non-return valves 25 and along the several branches to the several injectors, but also in the case where the flow of fuel through any one tuyere is interrupted. The solenoid 23 which actuates the valve 22 also is operatively connected with a valve 26 so as to open this valve 26 when the solenoid 23 is energized, and thus it is possible for any fuel in the part of the fuel conduit which rises up towards the valve 25 to flow downwardly out of this rising part of the conduit and to return through the discharge valve 26 to the reservoir which is not illustrated and from which the fuel is derived. The solenoid or the like 23 also serves to control a valve 27 in the compressed air conduit 11, opening this valve when the solenoid is energized, so that as a result compressed air will now flow through the injector to cool it. In this way the cooling effect which would normally be provided by the mazout is maintained by the compressed air derived from the conduit 11. The supply of atomized mazout is permanently maintained to all of the injectors by way of the circular header 28 which communicates with the conduit 10 and which communicates with a plurality of conduits leading to the several injectors and respectively carrying non-return valves 29 which prevent the hot blast or the gases of combustion from backing up through the conduits which lead to the header 28 through the valves 29, respectively, in the event that the supply of compressed air terminates for any reason. The pressure of the compressed air in the conduit 10 in which the atomized mazout is suspended is controlled, as shown diagrammatically in FIG. 1, by a suitable manometer 30.

Of course, in the example described above there are as many circuits for the fuel and for the cooling as there are tuyeres, and there is shown at 31 the several branches for the fuel supply to the several injectors of the several tuyeres, while there is indicated diagrammatically at 32 the several branches for the supply of compressed air to maintain the cooling of the injectors when the flow of fuel is interrupted.

With the process and apparatus described above, where there is a single control for the supply of fuel to all of the injectors, namely the valve 16, when the flow of fuel to any one of the injectors is interrupted by closing of the valve 22 which cooperates with the particular injector, the pressure of the hot blast does not change in any way and therefore the regulating device 14 maintains the rate of supply of fuel unchanged with the result that the same amount of fuel is distributed among a smaller number of injectors when as a result of the clogging of any one tuyere the flow of fuel through the injector thereof is interrupted in the manner described above. As a consequence, the ratio of fuel to air is increased under these conditions.

Inasmuch as clogging of the tuyeres occurs only infrequently and even then for only a short period of time, only a few minutes, this temporary increase in the fuel-air ratio is not serious. However, it can be avoided by providing each tuyere with a flow regulating device and then the sum of the flow of the hot blast through the several tuyeres will be equal to the total desired flow when all of the tuyeres are functioning properly. Therefore, when there is an interruption in the flow of fuel through any one injector there will be no increase in the supply of fuel to the other injectors. In other words, the arrangement can be such that there is provided for each tuyere a regulator 14 which controls a shut-off valve 16 in response to the movement of the hot blast for each tuyere above or below a certain range, so that the above-described single control structure for all of the tuyeres can be provided for each individual tuyere, if desired. Such an arrangement has the advantage of enabling the several tuyeres to be independently regulated so that it is possible to have different ratios between the fuel and air in the several tuyeres and in this way the fuel can be distributed among the several tuyeres according to the particular wishes of the operator of the furnace.

The above-described process and apparatus has been used in a blast furnace having a hearth diameter of 4.5 m. and provided with eight tuyeres, this particular furnace having a daily output of 600 tons of pig iron. During normal operations the pressure of the hot air blast was maintained at 500 g./cm.², and the total flow of hot blast was maintained at 50,000 m.³/h. The control of the flow of mazout was in accordance with the diagram shown in FIG. 2 where the flow $d$ of mazout is a function of the pressure $p$ of the hot blast. During normal operations the pressure of the blast was 500 g./cm.² and the flow of fuel 1200 kg./h. When the permeabiilty of the charge varies in the shaft and in accordance with these variations the supply of fuel was automatically adjusted in accordance with the graphic representation shown in FIG. 2. The slope of the curve shown in FIG. 2 is such that the rate of supply of fuel changed by 1.2 kg./h. for every variation of pressure of the hot blast equal to 1 g./cm.². If the pressure of the blast fell below 300 g./cm.², or if it exceeded 650 g./cm.², then the injection of fuel was completely terminated, as described above. On the other hand, if the flow of the hot blast through any one particular tuyere fell below 4500 m.³/h., then the injection of fuel in this particular tuyere was automatically terminated in a manner described above. The total minimum flow of mazout is thus 960 kg./h. where the pressure of the hot blast is 300 g./cm.² and the maximum flow of fuel is 1380 kg./h. for a hot blast pressure of 650 g./cm.². The consumption of coke in the blast furnace was thus reduced to an extent approximately equal to 600 kg./T. of produced pig iron.

It will be understood that each of the elements described above, or two or more together, may also find a useful application in other types of shaft furnaces differing from the types described above.

While the invention has been illustrated and described as embodied in controls for shaft furnaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and deired to be secured by Letters Patent is:

1. In a process for operating a shaft furnace in which a hot blast is introduced through tuyeres at a mean pressure within the range of a set minimum pressure to a set maximum pressure together with fluid fuel, the steps of increasing the rate of delivery of said fuel as the pressure of the blast increases above said mean pressure and decreasing the rate of delivery of said fuel when the pressure of the blast decreases below said mean pressure, and terminating the flow of fuel when the pressure of the blast transcends the limits of said range.

2. In a process for operating a shaft furnace in which a hot air blast is introduced through tuyeres at about a mean pressure within a range of about 300 grams per square centimeter to about 650 grams per square centimeter together with fluid fuel, the steps of increasing the rate of delivery of said fuel as the pressure of the blast increases above said mean pressure and decreasing the rate of delivery of said fuel when the pressure of the blast decreases below said mean pressure, and terminating the flow of fuel when the pressure of the blast transcends the limits of said range.

References Cited by the Examiner
UNITED STATES PATENTS

| | | | |
|---|---|---|---|
| 1,873,996 | 8/32 | Cunningham | 75—41 |
| 2,352,312 | 6/44 | Donaldson | 266—30 |
| 2,420,398 | 5/47 | Kinney | 75—42 |
| 2,690,333 | 9/54 | Pomykala | 266—29 |
| 2,879,056 | 3/59 | Wagner | 266—29 |
| 2,919,185 | 12/59 | Wahlberg | 75—42 |
| 3,150,962 | 9/64 | Pearson | 75—42 |
| 3,165,339 | 1/65 | Kennedy | 75—42 |
| 3,167,421 | 1/65 | Pfeiffer | 75—42 |

OTHER REFERENCES

Blast Furnace, Coke Oven, and Raw Materials Proceedings, vol. 19, 1960, pages 242–253 and 288–292.

DAVID L. RECK, *Primary Examiner.*

MORRIS O. WOLK, *Examiner.*